United States Patent [19]
King et al.

[11] 3,994,568
[45] Nov. 30, 1976

[54] GASKET FOR LIQUID CRYSTAL LIGHT SHUTTER DISPLAYS

[75] Inventors: Harry A. King, Yorba Linda, Calif.; John M. Washick, Mentor, Ohio

[73] Assignee: Hoffmann-La Roche Inc., Nutley, N.J.

[22] Filed: Sept. 13, 1973

[21] Appl. No.: 396,788

[52] U.S. Cl. .................................. 350/160 LC
[51] Int. Cl.² ........................................ G02F 1/13
[58] Field of Search .......... 161/165, 185, 186, 192, 161/203; 350/160 LC

[56] References Cited
UNITED STATES PATENTS

| | | | |
|---|---|---|---|
| 3,661,444 | 5/1972 | Matthies | 350/160 LC |
| 3,671,231 | 6/1972 | Haas et al. | 350/160 LC UX |
| 3,702,723 | 11/1972 | Borden, Jr. | 350/160 LC |
| 3,731,986 | 5/1973 | Fergason | 350/160 LC X |
| 3,771,855 | 11/1973 | Burns | 350/160 LC |

*Primary Examiner*—Edward S. Bauer
*Attorney, Agent, or Firm*—Samuel L. Welt; Bernard S. Leon; Mark L. Hopkins

[57] ABSTRACT

A gasket for liquid crystal light shutter displays, particularly field effect light shutter displays, comprising a high molecular weight thermoplastic resin, preferably a phenoxy polymer resin, which is not reactive with nor soluble in the liquid crystal material but which will bond two transparent plates together securely and restrict the flow of moisture or other contaminants from the atmosphere into a liquid crystal film disposed between the transparent plates.

8 Claims, 2 Drawing Figures

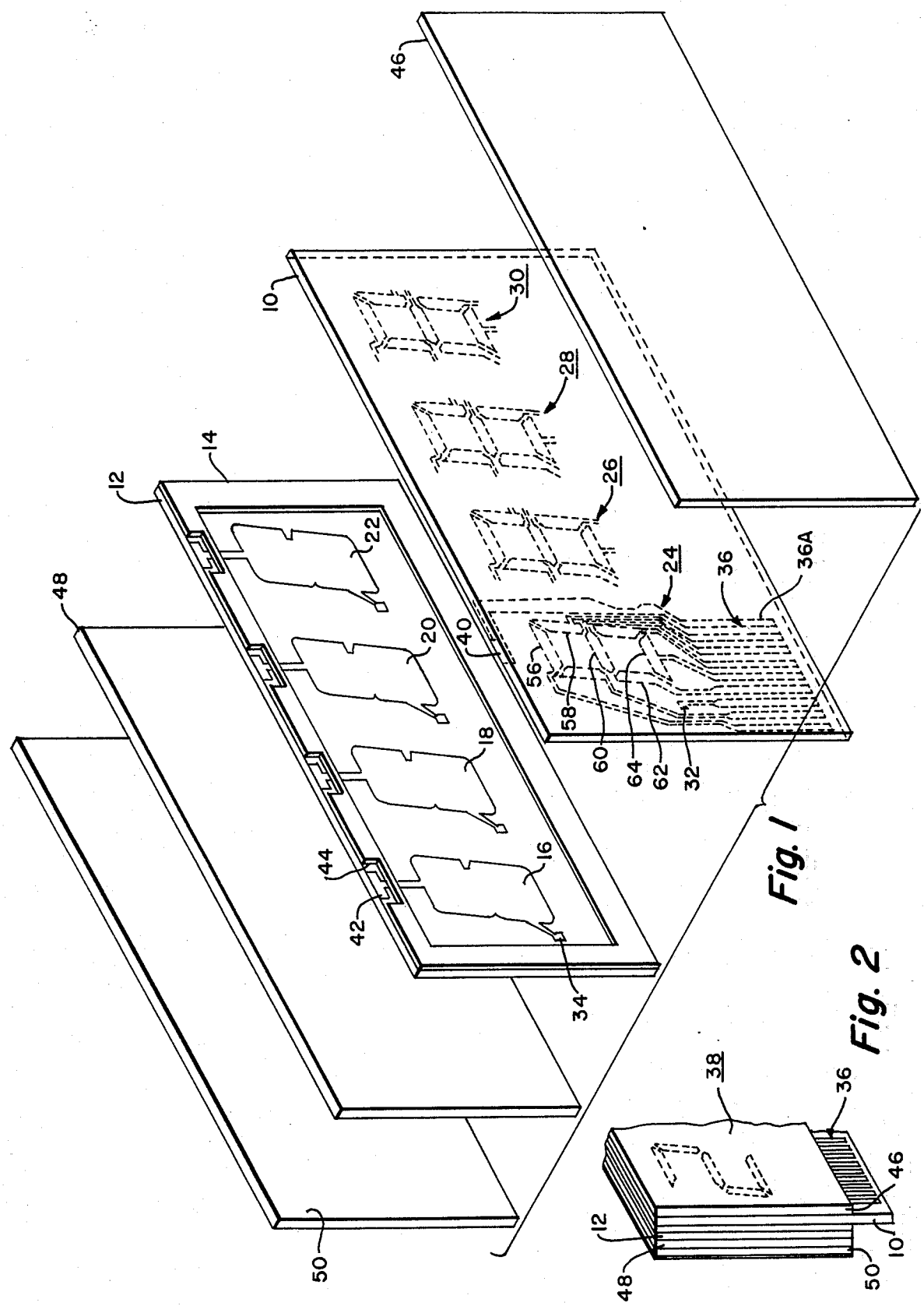

GASKET FOR LIQUID CRYSTAL LIGHT SHUTTER DISPLAYS

BACKGROUND OF THE INVENTION

There are two methods utilizing liquid crystals in light shutters for alpha-numeric displays and the like. One of these uses a light scattering effect generally known as dynamic scattering; while the other is of the field effect type employing a twisted nematic structure. The present invention is particularly adapted for use in field effect liquid crystal light shutter displays such as those shown in U.S. Pat. No. 3,731,986, issued May 8, 1973. Light shutters of this type comprise a layer of nematic liquid crystal material sandwiched between a pair of parallel transparent plates, the plates being coated on selected areas thereof with transparent conducting material to form an alpha-numeric display. The surfaces of the plates in contact with the liquid crystal material are rubbed at right angles to each other to effect a twisted nematic structure. Application of an electrical potential between the transparent electrodes will cause the nematic structure to rotate or untwist. By providing polarizers on opposite sides of the display, polarized light can be made to pass through the structure or be blocked, depending upon whether the polarizers are crossed or parallel to each other.

The liquid crystal material used in a light shutter, whether of the dynamic scattering or field effect type, is very sensitive to moisture contained in the air. This sensitivity is exhibited by an increase in the impressed voltage required to cause the crystals to rotate or untwist when an electrical field is applied thereacross. Two techniques have been attempted in the past to isolate these crystals from contaminants. In one technique, the liquid crystal material is hermetically sealed between glass plates with a ceramic or glass seal. In the other technique, a thermosetting silicone type sealer is utilized as a gasket around the layer of liquid crystal material, followed by a thermosetting epoxy adhesive to hold the glass plates together at a constant distance.

Neither of the foregoing methods for sealing a layer of liquid crystal material between parallel glass plates has proven wholly satisfactory. The ceramic and glass seals are expensive and require the addition of the liquid crystal to the space between the plates through one of two small holes drilled into the surface of one of the glass plates followed by sealing the holes. This is altogether a slow and expensive operation and not well suited to thin cells. In addition, the heat associated with this method of sealing may destroy the surface alignment required for operation of field effect liquid crystal displays of the type shown, for example, in the foregoing U.S. Pat. No. 3,731,986. The silicon-epoxy sealing system, while easier to manufacture, has not provided an adequate seal. With it, the current usage keeps increasing as contaminants are absorbed through the seal from the atmosphere.

SUMMARY OF THE INVENTION

In accordance with the present invention, a new and improved gasket for liquid crystal light shutter displays is provided which overcomes the disadvantages of prior art methods for sealing a liquid crystal material between parallel glass plates. The shutter can be applied by silk-screening techniques and is formed from a high molecular weight thermoplastic resin, preferably a phenoxy polymer resin which is also sometimes called a high molecular weight linear copolymer of bisphenol A and epichlorohydrin. The material from which the gasket is formed will not react with the liquid crystal material or in any way cause it to change its property significantly. Secondly, it will not react with the surface aligning agent, if required, or in any way alter its physical or chemical properties. Thirdly, the thermoplastic gasket of the invention will hold the transparent parallel plates rigidly and strongly together so that they will not appreciably change the thickness of the crystal layer in-between or allow the liquid crystal to leak out. Fourth, the thermoplastic gasket will reduce the inflow of contaminants or moisture from the outside atmosphere into the liquid crystal to such a low value that the display will not deteriorate in normal use for a prolonged period of time.

The above and other objects and features of the invention will become apparent from the following detailed description taken in connection with the accompanying drawings which illustrate an embodiment of the invention, and in which:

FIG. 1 is an exploded view of the liquid crystal cell of the invention showing the gasket used therein; and FIG. 2 is an end view of the assembled liquid crystal cell of the invention.

With reference now to the drawings, and particularly to FIG. 1, the liquid crystal cell shown is of the field effect light shutter type described in the aforesaid U.S. Pat. No. 3,731,986. It comprises a pair of transparent plates 10 and 12 separated by means of a gasket 14 which forms the subject matter of the present application. The gasket 14 spaces the plates in an amount equal to about 0.5 mil; and in the space between the plates 10 and 12 and within the enclosure formed by the gasket 14 is a layer of liquid crystal material. For purposes of the present invention, it will be assumed that the liquid crystal material is of the nematic type having a positive dielectric anisotropy as taught in U.S. Pat. No. 3,731,986.

As shown in FIG. 1, the opposing surfaces of the transparent plates 10 and 12 have formed thereon patterns of transparent conducting material such as tin oxide or indium oxide. The plate 12 is provided with four patches of transparent conductive material 16, 18, 20 and 22; while the other transparent plate 10 is provided with four sets of mutually-insulated strips of transparent conducting material, the four sets being identified generally by the reference numerals 24, 26, 28 and 30. When the plates 10 and 12 are bonded to opposite sides of the gasket 14, the transparent conductive patches 16–22 will be aligned with the sets of strips 24–30 on the plate 10. A dot 32 for each of the sets of strips on plate 10 will be aligned with a corresponding dot 34 on the plate 12.

The operation of the liquid crystal cell will be described hereinafter; however it will be appreciated that when all of the strips of the set 24, for example, are opaque while the surrounding areas transmit light, the resulting configuration will represent the numeral 8. Similarly, by causing selected ones of the strips in set 24 to become opaque, any numeral from 1 through 0 can be made to appear.

The various mutually insulated conductive strips in the sets 24–30 are adapted to be connected through a plurality of mutually insulated strips of transparent conducting material 36 to external leads, not shown. In this respect, it can be seen from FIG. 2 that the lower end of the plate 10 with the strips 36 thereon extends beneath the remainder of the liquid crystal cell, generally designated by the reference numeral 38, in order that a suitable electrical connector can be slipped over the lower portion of the plate 10 to connect the conducting strips 36 to external electrical circuitry. Note that the strip 36A extends from the bottom of the plate 10 all the way to the top thereof where it terminates in a horizontal portion 40 which is directly opposite a corresponding horizontal portion 42 connected to the patch 16 of electrically conducting material on plate 12. An electrically conductive epoxy material or the like is placed in opening 24 in the gasket 14 so as to interconnect the portions 40 and 42. With this arrangement, one terminal of a potential source can be connected to the strip 36A and, hence, to the conductive patch 16 on one side of the liquid crystal material; while selected ones of the remaining strips 36 can be connected to the other terminal of the same potential source, thereby establishing a potential gradient resulting in an electric field across the liquid crystal material in selected areas, depending upon which ones of the strips 36 are energized (i.e., connected to the other terminal of the potential source).

In the manufacture of the liquid crystal unit, the layers of transparent conducting material that are in contact with the nematic-phase liquid crystal material must be prepared by being stroked or rubbed unidirectionally with, for example, a cotton cloth. Furthermore, the transparent conducting material on plate 10 must be rubbed unidirectionally at right angles to the direction of rubbing of the transparent conductive material on plate 12. The effect of this is to produce a twisted nematic structure in the intervening liquid crystal material as is more fully explained in the aforesaid U.S. Pat. No. 3,731,986. In contact with the plate 10 is a first polarizing plate 46, and on the backside of the plate 12 is a second polarizing plate 48. The planes of polarization of the two plates 46 and 48 are at right angles to each other, the plane of polarization of the plate 46 being parallel to the direction of rubbing of the transparent conductive material on plate 10. Finally, behind the second polarizer 48 is a reflector 50, which is the subject of copending application Ser. No. 364,027, filed May 25, 1973. In essence, it is a reflector which will scatter polarized light without depolarizing the same such that the display can be viewed with ambient light passing into the liquid crystal film from the front and then reflected from reflector 50.

In the operation of the device, ambient light impinging on the forward face of the plate 46 will pass through the plate as light polarized in the direction of rubbing of the lines on the transparent conductive material of plate 10. This polarized light, as it passes through the layer of liquid crystal material between the plates 10 and 12, will be rotated through 90°; and this 90° rotation will occur throughout the entire surface area of the layer of liquid crystal material, assuming that an electrical potential is not applied between the electrically conductive coatings on the plates 10 and 12. The plane of polarization of polarizer 48 is at 90° with respect to that of polarizer 46. Hence, with no electrical potential applied between the electrically conductive films on plates 10 and 12, the polarized light will pass through the entirety of the liquid crystal cell, will be reflected from the reflector 50, and then will again pass through polarizer 48, the liquid crystal cell and polarizer 46. Under these circumstances, the entire display will appear white.

Now, if an electrical potential, on the order of 5 volts or greater, is applied between the conducting films on the plates 10 and 12, the liquid crystal unit will no longer rotate the plane of polarization through 90° in the areas of the energized strips on plate 10. Hence, under these circumstances, polarizer 48 will block the light in the areas across which an electrical potential exists and will appear dark on a white background. In FIG. 2, the numeral 2 is shown; and this can be achieved by applying a potential of one polarity to the conducting strip 36A whereby the patch 16 of electrically conductive material on plate 12 as a potential of one polarity applied thereto while applying a potential of the opposite polarity to the conductors connected to strips 56, 58, 60, 62 and 64 of the set 24. Similarly, other numerals can be made to appear by selectively energizing ones of the strips in each of the sets 26–30 while at the same time energizing the conductive patches 16–22 on the opposite side of the liquid crystal layer.

While the foregoing description has been limited to field effect liquid crystal displays utilizing a nematic liquid crystal material of positive dielectric anisotropy, it will be appreciated that the gasket arrangement of the present invention has application to other liquid crystal cells, such as those of the dynamic scattering type.

As was mentioned above, the gasket 14, in accordance with the prior art, has been formed from a silicone-epoxy; however this has not provided an adequate seal since the current usage keeps increasing as contaminants are absorbed through the seal from the atmosphere. The other technique used employs ceramic and glass seals which are expensive, among other things, and require a high degree of heat to fuse the glass, which heat may destroy the alignment of the rubbed surface required for operation of a field effect liquid crystal display. In accordance with the present invention, the gasket 14 is formed from a phenoxy polymer thermoplastic resin having an average molecular weight of about 6,000 to 30,000 and preferably 20,000 to 30,000 with the following molecular structure:

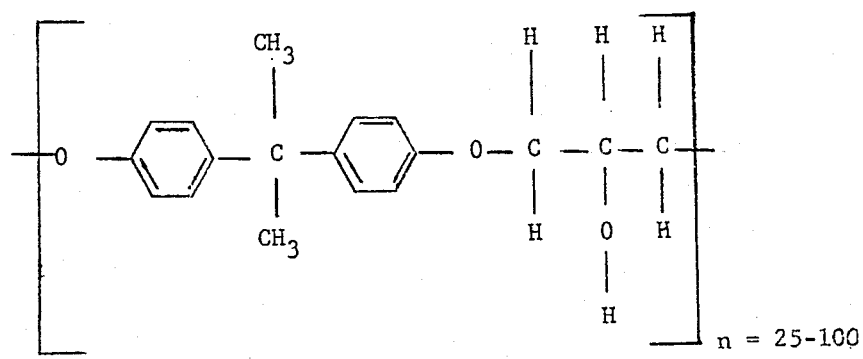

This resin is made from the reaction between bisphenol A and epichlorohydrin. The resin acts in an unusual way both bonding and sealing the liquid crystal much more efficiently than one would expect by examining its molecular structure or studying its past and present uses. For instance, because of the large number of hydroxyl radicals present in the polymeric structure, one would expect that even though water does not significantly affect it in film form, it would not be a highly efficient barrier to water vapor and other contaminants, especially at elevated temperatures where its thermoplastic nature would hurt this property. However, actual tests have shown that over a temperature range of −20° C to 60° C at approximately 50% relative humidity, average, this material reduces diffusion through the seal by a factor of twenty compared to the silicone-epoxy sealing system. Liquid crystal display cells sealed with this material have maintained a satisfactory current level after 500 hours storage at 60° C, 90% relative humidity, compared to 25 hours or less with the silicone-epoxy seal. Under ambient conditions, cells sealed with this material show no appreciable change in current after more than 100 days. Also, cells sealed with this material withstand thermal cycling from −20° C to +60° C (more than 30 cycles) and thermal shock from 0° C to 60° C (more than 10 cycles) much better than any previously tested method of sealing.

The preferred material for use as the gasket is phenoxy, Grade PAHJ of Union Carbide Corporation, New York, N.Y., although other grades of this and other manufacturers can be used just so long as the thermoplastic material is neither reactive nor soluble in the liquid crystal material and cannot wet the liquid crystal material. The gasket 14 is typically applied by silk-screening techniques; however before application the thermoplastic resin is mixed with a solvent, such as dimethylformamide, diethyl carbitol, butyl cellosolve, ethylene glycol, dimethyl ether, etc. Additionally, a modifier such as an uncured solid epoxy or other low molecular weight resin, a small amount of fumed silica and a very small amount of an organo-silicon compound may be added to improve the thixotropic (i.e., application, drying and adhesion) properties of the material for the silk-screening process. After silk-screening the gasket 14 onto the plate 12, for example, to a thickness of about 1.5 mils, the solvent is removed by evaporation, either forced or natural, resulting in a final adhesive thickness of about 0.5 mil. Alternatively, the gasket can be silk-screened onto both plates to a thickness of about 0.25 mil and the two halves of the gasket thereafter pressed together. Thereafter, the cavity formed by the gasket 14 is filled with liquid crystal material; and the plate 10 pressed against the gasket and heated under pressure to obtain the final seal. Because the phenoxy polymer resin is a thermoplastic material, the exact temperature, pressure, and time may be varied to meet specific requirements. The preferred time-temperature-pressure regime is 120° C for 10 minutes at 45 pounds per square inch of the gasket material. A typical composition which can be silk-screened onto the transparent plate 12, for example, is as follow:

TABLE I

| Constituent | Parts by Weight | |
|---|---|---|
| | Broad | Preferred |
| phenoxy polymer resin | 2–10 | 10 |
| modifier (e.g., epoxy polymer resin) | 0–10 | .5 |
| solvent (e.g., DMF) | 5–30 | 21–23 |
| fumed silica (e.g., CAB-O-SIL TM) | 0–1 | .5 |
| monosilane | 0–1 | .01 |

Instead of using a medium to high molecular weight solid, uncured epoxy resin as a modifier, it is also possible to use coumarone-indene resins and lower molecular weight phenoxy resins. Such materials may be added, if desired, in quantities from below 1% to as high as 50% or more depending upon the desired effect.

If the modifier is such that it will interact chemically with the liquid crystal layer between the plates 10 and 12, a two-stage sealing technique may be employed wherein an inner seal consisting of an inert material provides a barrier between the modified phenoxy and the liquid crystal material in the cell. The material for the inner seal is chosen such that it does not react chemically with the liquid crystal layer regardless of its hermetic properties. For example, the inner seal may be formed from a silicone resin or any other inert material which does not react chemically with the liquid crystal material.

Although the invention has been shown in connection with certain specific embodiments, it will be readily apparent to those skilled in the art that various changes in form and arrangement of parts may be made to suit requirements without departing from the spirit and scope of the invention. For instance, high molecular weight solid epoxy resins can have their widely separated epoxy rings reacted to form a "slightly" thermosetting adhesive-sealer which will behave in a similar manner to the all-thermoplastic phenoxy. Further, a phenoxy resin can be added as a plasticizer or modifier to another compatible resin conferring many of its desirable properties on the mixed system. In addition, some of the hydroxyls in the phenoxy resin can be reacted with a multifunctional cross-linking agent such as melamine or phenol formaldehyde and reacted to produce a product with many of its properties similar to the cross-linked phenoxy.

We claim as our invention:

1. In a liquid crystal light shutter, the combination of a layer of liquid crystal material sandwiched between transparent parallel plates, and a gasket surrounding said layer of liquid crystal material and bonding said plates together, said gasket being formed from an essentially thermoplastic phenoxy polymer resin which is neither reactive with nor soluble in the liquid crystal material and which will hold said parallel plates securely together while providing a seal around said layer of liquid crystal material.

2. The combination of claim 1 wherein said gasket is formed from a phenoxy polymer resin having the following molecular structure:

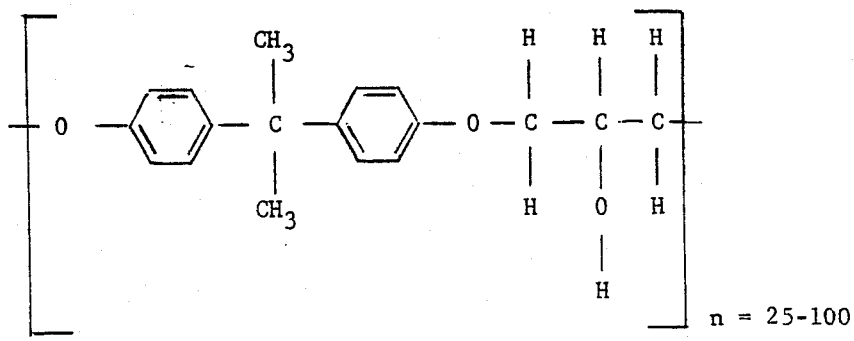

$n = 25-100$

3. The combination of claim 2 wherein the resin has a molecular weight of about 20,000 to 30,000.

4. The combination of claim 3 wherein said gasket is formed by silk-screening it in solution onto one of said plates.

5. The combination of claim 4 wherein said resin is mixed with a modifier, a solvent, fumed silica and an organo-silicon compound before being silk-screened onto said one plate.

6. The combination of claim 5 wherein said resin is mixed before silk-screening to form the following mixture:

| Constituent | Parts by Weight |
|---|---|
| resin | 2–10 |
| modifier | 0–10 |
| solvent | 5–30 |
| fumed silica | 0–1 |
| organo-silicon compound | 0–1 |

7. The combination of claim 6 wherein said constituents are present in parts by weight as follows: resin — 10, modifier — 0.5, solvent — 21–23, fumed silica — 0.5 and organo-silicon compound — 0.01.

8. In a liquid crystal light shutter, the combination of a layer of liquid crystal material sandwiched between transparent parallel plates, and a gasket surrounding said layer of liquid crystal material and bonding said plates together, said gasket being formed from an essentially thermoplastic phenoxy polymer resin which is neither reactive with nor soluble in the liquid crystal material and which will hold said parallel plates securely together while providing a seal around said layer of liquid crystal material, as is formed by silk-screening onto at least one of said transparent parallel plates a mixture comprising about 2 to 10 parts by weight of said resin, 0 to 10 parts by weight of a modifier, 5 to 30 parts by weight of a solvent, 0 to 1 part by weight fumed silica and 0 to 1% by weight of an organo-silicon compound, the transparent parallel plates being pressed together after application of said mixture in the form of a gasket with a layer of liquid crystal material between the transparent plates, whereupon said solvent is permitted to evaporate to form a bond between said plates with the liquid crystal material therebetween.

* * * * *